United States Patent [19]

Delespaul et al.

[11] Patent Number: 4,893,718

[45] Date of Patent: Jan. 16, 1990

[54] CONTAINER WITH WELDED ON COVER AND SCREW CAP

[75] Inventors: Frédéric Delespaul; Bernard Schneider, both of Sainte-Ménéhould, France

[73] Assignee: CEBAL, Clichy, France

[21] Appl. No.: 274,953

[22] Filed: Nov. 22, 1988

[30] Foreign Application Priority Data

Dec. 23, 1987 [FR] France ................................. 87 18527

[51] Int. Cl.⁴ .............................................. B65D 41/62
[52] U.S. Cl. ................................................... 215/232
[58] Field of Search ......................... 215/232; 220/359

[56] References Cited

U.S. PATENT DOCUMENTS

| | | | |
|---|---|---|---|
| 3,767,076 | 10/1973 | Kennedy | 215/31 X |
| 4,595,434 | 6/1986 | Eckstein et al. | 215/232 X |
| 4,605,136 | 8/1986 | Debetencourt | 215/232 |
| 4,697,719 | 10/1987 | Allen | 220/359 X |
| 4,738,080 | 4/1988 | Stockebrand | 215/232 X |

FOREIGN PATENT DOCUMENTS 179498  4/1986  European Pat. Off. .

Primary Examiner—Donald F. Norton
Attorney, Agent, or Firm—Dennison, Meserole, Pollack & Scheiner

[57] ABSTRACT

The invention concerns a tube with a plastic neck and with a cover to be welded over the neck after its cap has been fixed, the cover having at least one projecting portion for pulling it off, with cap holding the cover while it is being sealed over the neck. The cover has one or more projecting tabs, at least one of which is used to pull off the sealed cover and the cover is deformable and has little or no resilience. The end of the cap has a shoulder to press the cover onto the neck, which shoulder is configured so that it does not bear on the burrs of the neck, and the neck and cap have space between them for the bent back projecting tab or tabs of the cover. The invention also concerns a method of sealing the tube by induction or ultrasonic welding. The invention is used for the packaging of toiletries, cosmetics or food products.

6 Claims, 1 Drawing Sheet

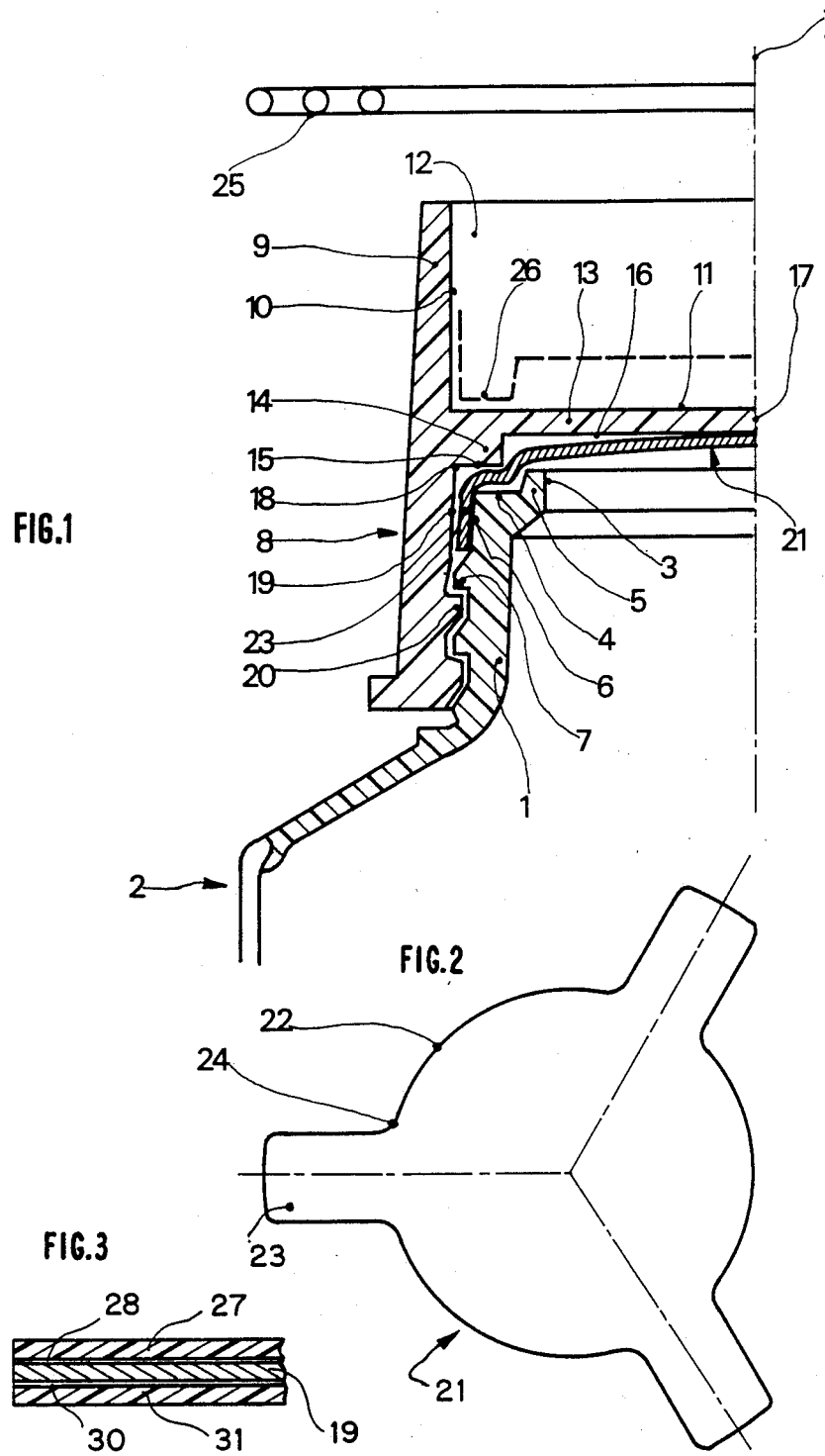

CONTAINER WITH WELDED ON COVER AND SCREW CAP

The invention concerns a pack comprising a tube with at least the neck made of plastics, a cap also made of plastics and a cover imperviously welded or to be welded over the end of the neck. It also concerns the method of sealing the tube by means of the cap and cover.

Document FR-A-2 148 645 (=GB 1 376 775=DE 2 237 322) describes a pack of this type where the cover projects from the end of the neck, the projection of the whole periphery of the cover forming the means for pulling it off after sealing. The cover is welded over the end of the neck by induction, after the cap or cover has been clasped over the neck; the cover may be in the form of an internal fitting of the top. The periphery of the neck orifice is inclined, leaving the periphery of the cover exposed, and the top is designed not to press onto the periphery. When the neck is made of polythene, the cover has a bottom thermoplastic layer "of polyester, polythene or polypropylene, which can be welded hot over the neck" and a metallic layer on top (metal foil). An upper reinforcing layer, of kraft paper or synthetic plastics, may be provided if the strength or thickness of the metallic layer is not sufficient to retain the contents of the receptacle.

The solution thus described applies to special geometries of the neck and the cap or cover, and the peripheral projection of the cover is a pull off means of debatable convenience.

Applicants have attempted to perfect a solution which would be valid for a substantially straight, threaded neck, where the cover comprises at least one pull off tab which can easily be taken hold of after welding, the cover definitely being welded imperviously although there may be a burr which has not been cut off the end of the neck.

STATEMENT OF INVENTION

The first subject of the invention is a pack which, in a manner known from FR-A-2 148 645, comprises a tube with a plastic neck, a cap also made of plastics and a cover, which can be welded over the end of the neck after the cap has been fixed onto the neck, said cover comprising at least two external, plastic-based layers and a barrier layer for aromas and oxygen and having at least one projecting portion for pulling off the welded cover; said cap holding said cover while it is being sealed over the neck. According to the invention, simultaneously;

the cover has a circular outline, of a diameter equal or almost equal to the outside diameter of the end of the neck, except for a radially projecting tab (23) or a plurality of spaced radially projecting tabs, at least one of the tabs being used to pull off the sealed cover;

the cover is deformable and has little or no springback effect, so that it can straddle any burr at the end of the neck without any danger of bursting;

the neck and the inside of the cap are threaded, and the end of the cap has a peripheral shoulder for pressing the cover over the end of the neck (1), the shoulder having an inside diameter selected between the inside and outside diameters of the neck, so that it does not bear on the burrs at the end of the neck and hence does not press the cover onto such a burr;

the outside of the neck and the inside (19) of the cap (8) below said shoulder have a space between them, which can contain the projecting tab or tabs (23) bent back against the neck.

These means are all necessary if the neck of each tube is to be sealed tightly by its cover in a mass production process and opened easily by the user. They can be explained as follows:

A first difficulty is the frequent presence of an uneven surface at the end of the neck, due to slightly oblique cutting of the end, caused by the strain put on the tube by the cutting tool and the practical tolerances for cutting the injection sprue. These conditions often lead to the presence of an asymmetric burr which extends the neck orifice and typically has a maximum height of about 0.6 mm and a maximum radial thickness of 0.8 mm. If no special precautions are taken the burr leads to non-welding and sometimes bursting of the cover, which is gripped between the bottom of the cap and the end of the neck. A second difficulty is to obtain both impervious sealing and easy removal of the cover, with the pull off means retaining sufficient strength once the cap has been taken off.

The first difficulty is resolved primarily by the geometry of the pressing means at the bottom of the cap in the tightened position, these means being a peripheral shoulder which remains outside the burrs—the tolerances for which are known from manufacture—the bottom or bearing surface of the shoulder being flat and perpendicular to the axis of the pack, the central surface of the bottom of the cap being set back enough for it not to press the cover onto the burr. It is further resolved by the choice of cover, the composition and thickness of which make it "deformable and with little or no springback effect."

This expression means that when the cover is folded at a certain angle with a folding radius of 1 mm, its residual angular deformation after the folding strain has been relaxed is typically at least half its deformation at the end of the folding step.

There is hardly any danger that this type of cover may be burst by any burr at the end of the neck, due to its nature and thickness and because when the cap is screwed right down onto the neck the burr raises the central part of the cover where there is no pressure from the end of the cap. As for the second difficulty, the annular zone where the periphery of the cover is gripped is defined in practice and easily adjustable: it extends from the inside bearing diameter of the peripheral shoulder of the end of the cap to the outside diameter of the end of the neck, when the diameter of the circular outline of the container is equal to or slightly larger than it—typically by a maximum of 0.5 mm—or to the diameter of the circular outline of the container and the beginning of the projecting tab or tabs, when that cover diameter is slightly smaller than the diameter of the end of the neck—typically by less than 0.3 mm.

The annular zone of the cover which is welded over the end of the neck by induction or ultrasound corresponds to this gripped zone, and its size is controlled by the welding conditions, particularly power and time, in a way which can be reproduced. The width of the zone may be modified within fairly wide limits to adjust either the guarantee of tightness or the force required to pull off the cover. Screwing the cap home is far preferable to clipping it on since it gives a grip which is sufficient for welding and which can easily be reproduced.

The space left between the end of the neck and the cap in the tightened position, to contain the projecting tab or tabs bent back along the neck and keep them strong, may be in various forms, e.g. a longitudinal recess inside the end of the neck where there is only one tab, or smooth peripheral surfaces at the top of the neck and inside the cap below its peripheral shoulder where there are a plurality of tabs, the screw thread starting below the smooth surfaces. Experience shows that in this position the tab or tabs are not welded or stuck to the neck at all by the welding operation. Portions of screw thread with enough space between them to contain the tabs may be retained, provided they are not of a shape or type which would damage the tabs, with a view to pulling off the cover.

The cover preferably has at least 3 projecting, regularly spaced tabs of the same geometry, and these tabs then have the following function and effects:

When the cover is sunk into the cap, the tabs projecting from the cover are bent back as they slide along the lateral threaded wall of the cap, and the circular central portion is then deformed, with its surface towards the bottom of the cap becoming and remaining slightly rounded. In the second place it is found that in the sinking operation the tabs maintain the centering of the cover or correct the centering when it is imperfect, e.g. to the nearest 0.5 to 1 mm, at the beginning of the sinking operation. The contact between the tabs and the inside of the cap is then found to keep the cover in position at or near the bottom of the cap during handling. Furthermore the rounding of the cover sunk into the cap makes it straddle any burr at the end of the neck, so that even if there is slight contact with the burr there is definitely no risk of the cover being burst or torn by the burr when the cap is tightened. The cover is detached from the end of the tube except in its annular portion gripped by the peripheral shoulder of the cap, and hence the welding zone of the cover is still more clearly defined.

In practice the preferred number of regularly spaced tabs is 3 or 5, typically corresponding to covers with a circular outline diameter of from 8 to 16 mm. More generally, the recommended number of tabs to obtain all the effects of the invention is from 3 to 7.

In the frequent case where the pack according to the invention comprises a polypropylene cap and a tube with a polythene neck, the cover according to the invention, which is deformable and has little or no resiliency, preferably comprises the following layers when it has to be welded onto the neck either by induction or by ultrasound after being gripped by screwing down the cap:
  an upper layer based on polyester or polythene, possibly mixed with adhesive;
  a central barrier layer made of aluminium, from 10 to 60 micron thick;
  a bottom layer made of material from the group made up of: copolymer or mixture based on EAA; EVA; propylene-ethylene copolymer; this material possibly being mixed with adhesive.

This bottom layer may itself be the sealing layer of the cover or may be followed by an additional bottom layer acting as a seal and based on polyolefin, e.g. based on polythene, polypropylene or polybutylene. The thickness of the cover is from 0.12 to 0.40 mm and usually from 0.16 to 0.33 mm. Intermediate adhesive layers may be intercalated; the central aluminium layer acts as a barrier for aromas or perfumes and is impervious to oxygen. A different type of metallic layer may be envisaged. It should be noted that a bottom layer of polyester is unsuitable, contrary to what is said in FR-A-2148645.

In this same instance, with the polypropylene cap and polythene neck, the cover according to the invention, instead of having a central aluminium layer, may preferably have at least the following layers, when it is to be welded by ultrasound:
  an upper, barrier layer of polyester with 10 to 30% by weight of inorganic fillers added, possibly mixed with adhesive;
  a complementary central barrier layer made of material from the group comprising: copolymer based on polyvinyl alcohol (EVOH), amorphous polyamide (PA), polyamide with an aromatic nucleus, polyvinylidene chloride (PVDC);
  a bottom, sealing layer based on polyolefin, typically polythene or a mixture of polythene and adhesive;
and the cap may have an external surface perpendicular to its axis to which an ultrasonic probe or sonotrode, with a preferably annular end, may be applied at right angles to the annular surface for gripping the carrier.

The thickness of the ultrasonically weldable cover is usually from 0.10 to 0.30 mm. It may have intermediate adhesive layers. The purpose of the inorganic fillers in the upper layer is to make the carrier more capable of permanent deformation. The fillers are in fine powder form, of a particle size below 50 micron, and their presence has no marked effect either on the deformability of the carrier or on ultrasonic transmission for welding its lower surface onto the neck.

In the various cases envisaged the length of the tab or tabs projecting from the carrier is typically from 2 to 6 mm. When the neck and cap are in the tightened, i.e. screwed down position they preferably have smooth interfacing peripheral surfaces over a height at least equal to that length of the tab or tabs from the end of the neck, so that the tab or tabs can be held there without risk of damage however the carrier is directed.

The second subject of the invention is the method of sealing a tube with a plastic neck by means of a cap also made of plastics with a carrier interposed, these three elements making up the pack according to the invention. Preparatory stages (a) and (c) in the process each include means which are novel relative to those taught by FR-A-2 148 465, and assembly stages (d) to (f) are distinguished from that prior art by the novelty of the products, the different result of stage (d), and the alternative of ultrasonic welding at stage (f).

In the general case the sealing process thus comprises the six following stages:
  (a) a deformable laminate with little or no resilience is provided, comprising at least 2 external layers based on plastics and a barrier layer, the laminate being from 0.10 to 0.40 mm thick;
  (b) a cover is cut out of the laminate, the cover having a circular outline with a diameter between the outside diameter of the end of the neck minus 0.3 mm and that diameter plus 0.5 mm, and comprising a radially projecting tab or a plurality of regularly spaced radially projecting tabs, the cover being of a type which can straddle a burr on the neck without any risk of bursting;
  (c) a tube is prepared, with screw thread on the neck and the cap, the end of the cap having a peripheral shoulder to bear on the end of the neck, the inside diameter of the shoulder being between the inside and outside diameters of the neck and being chosen so that it does not press the cover onto the burr not cut off at the end of the neck, the outside of the neck and the inside of the cap below that shoulder having a space between them which can contain the tab or tabs projecting from the cover;

(d) the cap is arranged at or near the end (13) of the cap, the circular portion of the cover being centred therein and its projecting tab or tabs being bent back towards the inside lateral surfaces of said cap;

(e) the cap thus fitted with the cover is taken to the neck of the tube and screwed right down onto the neck;

(f) the cover is then welded onto the end (4) of the neck either by induction or by ultrasound, according to the nature of the cover.

In this process the following means are preferably adopted together:

at stage (b) a cover is cut out, comprising 3 to 7 regularly spaced radially projecting tabs, of unit dimensions length 2 to 6 mm × width 2 to 5 mm;

at stage (c) the end of the neck and the inside of the cap below its peripheral bearing shoulder have a peripheral space between them, which can contain the tabs projecting from the cover, however the cover is directed;

($d_1$) the cover is placed flat over the open end of the upturned cap and centred relative to said end typically to the nearest 0.5 mm;

($d_2$) the cover is pushed by its circular portion to or near to the end of the cap, the projecting tabs being bent back and then acting as means for centering and engaging the cover in the cap.

Whether the general case or the preferred process is involved, in cases where the pack comprises a screw cap of polypropylene and a tube with a threaded neck of polythene a multi-layer cover is adopted, with the preferred layers previously described respectively for induction or ultrasonic welding and for ultrasonic welding only.

In the latter the case the cap must have an external surface to which an ultrasonic probe or sonotrode may be applied at right angles to the tightened zone of the cover, and that surface may conveniently be the bottom of a central cavity in the cap permitting guided mounting of the probe or sonotrode. The cap may have the same geometry for either induction or ultrasonic welding of the cover. The function of the inorganic fillers in the upper layer of the covers without an aluminium layer, designed for ultrasonic welding, has already been described; they are fine powders with a particle size below 50 micron and preferably below 30 micron, of materials typically chosen from calcium carbonate, silica, talc and glass.

ADVANTAGES OF THE INVENTION

The cover according to the invention has one or more tabs, making it easy to pull off. It is welded tightly and in a particularly reliable manner through the cap despite the burrs on the neck. The sealing process is simplified and made easier to reproduce, in the case of covers carrying at least 3 regularly spaced projecting tabs, by the self centering effect due to the tabs when the cover in sunk into the cap.

BRIEF DESCRIPTION OF THE DRAWINGS

FIG. 1 shows a pack according to the invention in the assembly position just before welding, in a longitudinal axial half section passing through the axis of a tab projecting from the cover.

FIG. 2 is a plan view of the cover of the pack.

FIG. 3 is an expanded, cross-sectional view of a portion of a cover according to the invention.

Referring to FIG. 1, this shows the polythene neck 1 of a tube 2, provided at the end with the orifice 3 with a diameter of 8.13 mm. The end surface 4 of the neck 1, perpendicular to the longitudinal axis Z, is interrupted by a burr 5; the periphery of the burr is slightly out of round, with a diameter of 9 to 9.5 mm and a height of 0.3 to 0.5 mm. The top 6 of the side surface of the neck is circular cylindrical, with a diameter of 13.2 mm over 4.5 mm from its end, before the beginning of the root of the screw thread 7, 13.6 mm in diameter.

The top part of the polypropylene cap 8 has a lateral skirt 9 around a central cavity with a circular cylindrical periphery 10 which is 14.3 mm in diameter and 6 mm deep, the bottom 11 of the cavity 12 being flat and perpendicular to the axis of the pack. The inner end 13 of the cap 8 has a shoulder 14 round its periphery, with a flat undersurface 15 of inside diameter 10.5 mm and a central portion, the undersurface 16 of which is set back 1 mm from the surface 15 of the shoulder 14. The skin forming the end 17 of the cap is 1 mm thick at the level of the central portion 16 and 2 mm thick at the level of the shoulder 14. The undersurface or bearing surface 15 of the shoulder 14 has a periphery 18 which is 14 mm in diameter and which meets the beginning of a smooth circular cylindrical surface 19, 6 mm high, preceding the screw thread 20 inside the cap 8.

The cover 21, which is shown in plan prior to assembly in FIG. 2, has circular outline 22 with a diameter of 13.5 mm, with 3 radially projecting tabs such as 23 spaced at 120°, each tab being 4.5 mm long and 3 mm wide. The feet of the tabs are linked with the circular outline 22 by portions 24 which radiate slightly at a radius of 0.5 mm. The covers in both of the following series of tests all have the same outline.

A portion of cover 21 is shown in cross-section in FIG. 3, and includes upper layer 27, adhesive layer 28, central barrier layer 29, adhesive layer 30 and bottom layer 31.

For each assembly the cover 21 is arranged flat over the open end of the cap 8, centered by eye, then pushed with a round bar to near the bottom 16 of the cap 8; the cap 8 is turned over and screwed right down on the neck 1 of a tube 2. The position of the cover 21, with one of its three tabs 23 bent back along the top 6 of the neck, is shown in FIG. 1, the cover 21 being gripped between the 10.5 mm inside diameter of the shoulder 14 of the cap 8 and the 13.2 mm outside diameter of the end 4 of the neck 1. The part of the cover 21 inside its gripped portion remains rounded; it straddles the burr 5 of the neck and is left free by the recessed bottom 16. Checks carried out before and after welding show that the tabs 23 are not damaged either by the screwing or by the welding, which leaves them detached from the cap and the neck.

FIRST SERIES OF TESTS (INDUCTION WELDING)

The covers were cut out of a 5 layer strip 0.31 mm thick. The layers were of the following types, working down from the upper surface of the cover to its lower or sealing surface: PE/adhesive copolymer/40 micron Al/EAA based copolymer/70 micron PE. One cover was folded manually over the edge of a table and showed little resiliency. Some 20 tests were carried out by the method of the invention and satisfactory welds were obtained for the covers under the following conditions:

with an inductor comprising a flat circular spiral 25 of 3 windings (FIG. 1), with an outside diameter of 30 mm and a pitch of 3 mm, perpendicular to the axis Z and centered on that axis, located 2 to 3 mm above the cap 8, i.e. about 10 mm above the cover 21, which was held onto the cap 1 by the peripheral shoulder 14; frequencies 350 to 450 kHz.

SECOND SERIES OF TESTS

The covers used were identical with those in the first series.

Tests on some 10 covers were carried out with a sonotrode with a hollow titanium end 26 applied to the bottom surface 11 of the cavity 12 in the cap 8, the end 26 having inside and outside diameters of 11 and 14 mm. The 14 mm outside diameter enables the sonotrode to be applied in a position which can be reproduced well in assembling different packs. High quality welds were obtained with: 700 W - 40 kHz - held from 0.1 to 0.2 second with the sonotrode pressed well down. The position of the end 26 of the sonotrode is shown in broken lines in FIG. 1.

THIRD SERIES OF TESTS

The covers, of the same geometry as before except for their thickness, were cut out of a three layer strip 0.215 mm thick; the layers were of the following types, working down from the upper surface to the lower or sealing surface of the covers: polyester charged with 15% by weight of 120 micron titanium oxide powder/15 micron adhesive/80 micron polyolefin.

High quality welds were obtained in the same configuration as in the previous test series, with the same sonotrode and a similar adjustment: 700 W - 40 kHz - with the sonotrode held for 0.2 second.

APPLICATIONS

The pack according to the invention and the method of closing it are used for packing toilet goods, pharmaceuticals, cosmetics and food products. The reliable sealing of the tube by the guarantee cover and the ease in tearing off the cover are important advantages.

We claim:
1. A pack comprising:
   a tube having an externally threaded, plastic neck;
   an internally threaded, plastic cap which can be fixedly screwed onto the neck; and
   a cover which can be welded over the end of the neck while it is held in place by said cap fixed onto the neck, said cover being generally circular, of a diameter substantially equal to the outside diameter of the end of the neck, having at least one radially projecting tab used for removal of the welded cover from the neck, being deformable with little or no springback effect, and comprising at least two external plastic-based layers and at least one barrier layer therebetween; wherein
   said cap has a closed end abutted internally by a peripheral shoulder for pressing the cover over the end of the neck, said shoulder having an inside diameter between the inside and outside diameters of the neck, said closed end thereby being recessed so as not to press said cover onto any burr which may be at the end of the neck, the circular portion of the cover straddling any such burr without danger of bursting; and
   fixing said cap to said neck forms a space between the outside of the neck and the inside of the cap below the shoulder, said space for containing said at least one tab bent back along the neck.
2. The pack of claim 1 wherein the cover (21) has 3 to 7 tabs equally spaced around the periphery thereof.
3. The pack of claim 1 or claim 2, wherein the cap (8) is made of polypropylene and the neck (1) of the tube (2) of polyethylene, the cover (21) comprising the following layers:
   an upper layer based on polyester, polyethylene, or mixtures thereof with adhesive;
   a central barrier layer made of aluminum, from 10 to 60 microns thick;
   a bottom layer made of material selected from the group consisting of copolymer or mixture based on EAA; EVA; propylene-ethylene copolymer; and mixtures thereof with adhesive; the thickness of the cover (21) which can be welded over the neck (1) by induction or ultrasound when the cap (8) has been screwed on, being from 0.12 to 0.40 mm.
4. The pack of claim 3, wherein the cover (21) has an additional bottom layer based on polyolefin below said bottom layer.
5. The pack of claim 1 or claim 2, wherein the cap (8) is made of polypropylene and the neck (1) of the tube (2) of polyethylene, the cover (21) comprising the following layers:
   an upper barrier layer made of polyester with 10 to 30% by weight of mineral fillers added, or said polyester with mineral filler mixed with adhesive;
   a central barrier layer of a material selected from the group consisting of copolymer based on polyvinyl alcohol (EVOH), amorphous polyamide (PA), polyamide with an aromatic nucleus, and polyvinylidene chloride (PVDC);
   a bottom, sealing layer made of polyethylene or a polyethylene/adhesive mixture; the cap (8) having an external surface (11) perpendicular to its axis which enables an ultrasonic probe (26) to be applied at right angles to the cover (21) portion to be pressed over the end of the neck, the thickness of said cover (21), which can be welded onto the neck (1) by ultrasound, being from 0.10 to 0.30 mm.
6. The pack of claim 1 or 2, wherein the projecting tab or tabs (23) have a length of from 2 to 6 mm, and wherein the neck (1) and the cap (8) in the closed position have smooth, interfacing peripheral surfaces (6) and (19) over a height at least equal to that length, from the end (4) of said neck (1).

* * * * *